United States Patent
Kim et al.

(10) Patent No.: US 7,512,421 B2
(45) Date of Patent: Mar. 31, 2009

(54) METHOD FOR SETTING SUBSTITUTE RINGBACK TONE OF CALLING PARTY IN MOBILE COMMUNICATIONS SYSTEM

(75) Inventors: Sok-Bom Kim, Seoul (KR); Seong-Yil Kwon, Seoul (KR)

(73) Assignee: RealNetworks Asia Pacific Co., Ltd., Seoul (KR)

( * ) Notice: Subject to any disclaimer, the term of this patent is extended or adjusted under 35 U.S.C. 154(b) by 370 days.

(21) Appl. No.: 10/582,890

(22) PCT Filed: Nov. 19, 2003

(86) PCT No.: PCT/KR03/02496

§ 371 (c)(1),
(2), (4) Date: Jun. 14, 2006

(87) PCT Pub. No.: WO2005/051015

PCT Pub. Date: Jun. 2, 2005

(65) Prior Publication Data

US 2007/0123311 A1    May 31, 2007

(51) Int. Cl.
*H04B 1/38* (2006.01)
*H04M 3/42* (2006.01)

(52) U.S. Cl. ............. 455/567; 379/201.01; 379/207.08; 379/207.16

(58) Field of Classification Search ............ 455/414.1, 455/418, 567; 379/201.01–201.08, 207.08–207.16
See application file for complete search history.

(56) References Cited

U.S. PATENT DOCUMENTS

| | | | | |
|---|---|---|---|---|
| 7,336,777 B2* | 2/2008 | Lee et al. | ............... | 379/207.08 |
| 2004/0081304 A1* | 4/2004 | Lee | ............... | 379/207.04 |
| 2004/0120493 A1* | 6/2004 | Creamer et al. | ........ | 379/207.08 |
| 2004/0120494 A1* | 6/2004 | Jiang et al. | ............. | 379/210.01 |
| 2005/0105706 A1* | 5/2005 | Kokkinen | ............. | 379/201.01 |

FOREIGN PATENT DOCUMENTS

| | | |
|---|---|---|
| CN | 1507290 | 6/2004 |
| JP | 2003-274016 | 9/2003 |

(Continued)

OTHER PUBLICATIONS

Notification of First Office Action-State Intellectual Property Office of People's Republic of China, dated Apr. 18, 2008; Application No. 200380110968.X.

*Primary Examiner*—Vincent P. Harper
*Assistant Examiner*—Omoniyi A Obayanju
(74) *Attorney, Agent, or Firm*—Ladas & Parry LLP

(57) ABSTRACT

A caller may set his telephone's substitute ringback tone to be identical to that of the receiver or to that of a third party. Further, a caller may provide a substitute ringback tone to another recipient as a present. A substitute ringback tone playing server in the system checks whether there is a certain key input or key input stream from the caller requesting of bringing substitute ringback tone of the called party. Responding to the request, a bringing server sets the substitute ringback tone code of the caller stored in a playing control server as that of the called party. A user interface server allows a user to select a substitute ringback tone among multiple tones stored in a database to give to another person as a present.

3 Claims, 5 Drawing Sheets

FOREIGN PATENT DOCUMENTS

| | | |
|---|---|---|
| KR | 10-0292089 | 3/2001 |
| KR | 2002-0056833 | 7/2002 |
| KR | 2002-0097046 | 12/2002 |
| KR | 2003-0067613 | 8/2003 |
| KR | 2003-274016 | 9/2003 |
| WO | 03/071815 | 8/2003 |

* cited by examiner

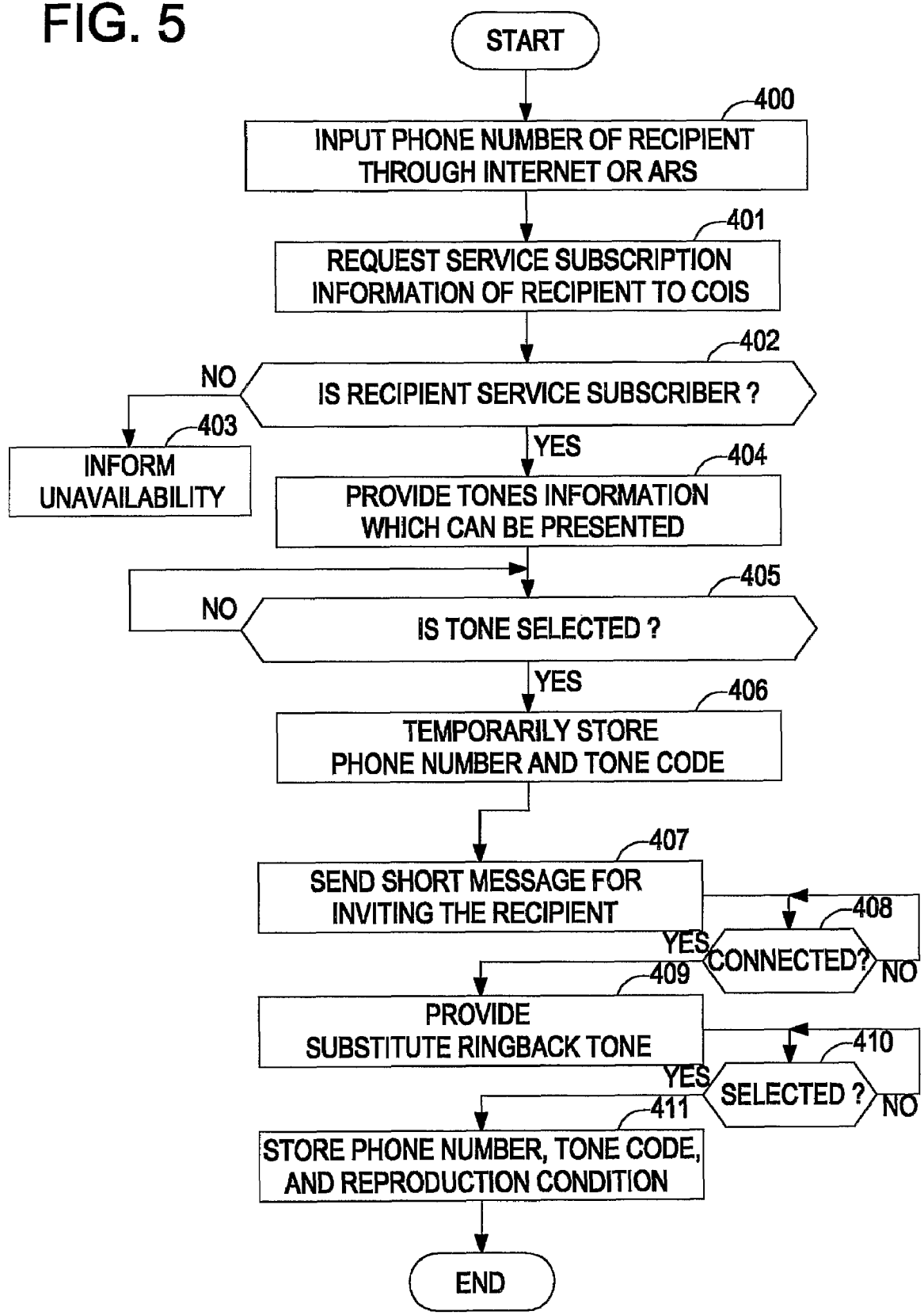

METHOD FOR SETTING SUBSTITUTE RINGBACK TONE OF CALLING PARTY IN MOBILE COMMUNICATIONS SYSTEM

BACKGROUND OF THE INVENTION

1. Field of the Invention

The present invention relates to a call setup process in a communications network and more particularly to a method of setting up a calling party's (i.e., "a caller's") substitute ringback tone during a call set up process until the called party (i.e., "the receiver") responds to the call from the caller.

2. Description of the Prior Art

When a calling party (i.e., "a caller") originates a call in a communications network to a called party (i.e., "a receiver"), a terminating switch or a network to which the receiver's communication terminal (e.g., a mobile telephone is connected to may provide a traditional-type of ringback tone to the caller until the receiver responds to the call. A typical traditional ringback tone resembles, for example, a monotone sound that turns on and off at a fixed frequency, which is generally perceived as being unpleasant or annoying to the caller or any listener hearing the tone. Recently, however, a substitute ringback tone service is gaining popularity, as the service allows a substituted ringback tone designated by a receiver (who is also a subscriber of the substitute ringback tone service) instead of an annoying tone to be played out to the caller until the connection is made between the caller and the receiver. example, in Korean Patent No. 292089 issued 20 Mar. 2001, entitled METHOD AND APPARATUS FOR GENERATING SUBSTITUTE RINGBACK TONE DESIGNATED BY CALLED PARTY IN TERMINATING SWITCH IN COMMUNICATIONS NETWORK, and Korean Laid-open Patent 2002-56833 published 10 Jul. 2002 and entitled METHOD AND APPARATUS FOR PROVIDED SUBSCRIBER-BASED SUBSTITUTE RINGBACK TONE.

According to the services disclosed by these references, a receiver (who is also a subscriber of a substitute ringback tone service) is allowed to select and set the receiver's own substitute ringback tone, so that the switch would produce the sounds of the substitute ringback tone set by the receiver (instead of the traditional ringback tone) to the caller while the call connection is being set up (i.e., until the call setup process is completed) between the caller and the receiver. A substitute ringback tone may include a musical melody, a specific sound, a sound effect, or an advertisement message, among others, that may enable the call receivers (that is, the subscribers) to emphasize their personalities through sounds of the substitute ringback tones being played out to the callers. A caller would also be able to identify whether a call has been correctly placed to the intended receiver even before the receiver responds to the call just by hearing the personalized substitute ringback tone that characterizes the receiver.

Then, situations may arise in which a caller hearing a substitute ringback tone of the receiver also desires to adopt that same substitute ringback tone of the receiver to be the caller's own. However, it is rather difficult for a caller to set his own substitute ringback tone to be the same as the receiver's substitute ringback tone. This is because a caller who wishes to change the caller's substitute ringback tone to be the same as the receiver's substitute ringback tone that the caller heard while placing a call to the receiver, has to search for the heard substitute ringback tone in a content server through the Internet (the WAP-based wireless Internet or the ARS system). This search requires much effort on the part of the caller that may result in wasted time and expense, and in particular, the searching burden worsens when there are multiple contents providers providing similar services.

SUMMARY OF THE INVENTION

To solve the above and other problems, the present invention provides a method of setting substitute ringback tone which enables a caller to set his/her substitute ringback tone to be identical to that of a receiver's substitute ringback tone while the caller is hearing the substitute ringback tone of the receiver when placing a call to the receiver.

In addition, the present invention provides a method of setting a substitute ringback tone which enables a caller to set the caller's substitute ringback tone to be identical to that of a receiver even after completing a call and confirming the change of the tone.

Further, the present invention provides a method of setting substitute ringback tone which enables a caller to set the caller's substitute ringback tone to be identical to that of another subscriber by accessing a server through a communications network at any time after the completion of a call.

Still further, the present invention provides a method of setting a substitute ringback tone which enables a subscriber to access a server through a communications network to present a substitute ringback tone to a receiver, so that the substitute ringback tone of the receiver is changed after the confirmation of the third party.

A method of setting the substitute ringback tone for achieving the above and others solved by the present invention is implemented in a system connected to a mobile switching center to provide a substitute ringback tone to a caller terminal when the mobile switching center suspends a call to a called terminal and requests a service by providing an identification code of the called terminal. The system includes a play control server for storing substitute ringback tone information set for each service subscriber, and a play server for storing various substitute ringback tones and reproducing and providing one of the various substitute ringback tones in response to the request from the mobile switching center. The ringback tone is selected based on the setting information stored in the play control server.

According to an aspect of the present invention, when the system receives a call, which includes the identification code of the called terminal, from the mobile switching center, the system identifies a tone code for the called terminal from the play control server, reproduces the substitute ringback tone having an identified tone code, and provides the substitute ringback tone to the caller terminal. When a predetermined key input is received from the caller terminal during the reproduction, the system checks the identification code of the caller terminal and the tone code for the called terminal. The system stores the identification code and the tone code in the play control server, such that the substitute ringback tone of the caller terminal is set to be identical with the substitute ringback tone of the called terminal. After the completion of the change, the system preferably sends a short message to the caller terminal for notifying change of the substitute ringback tone.

In a case where the system provides the substitute ringback tone service only for service subscribers, it is preferable that the system carries out the process of changing the tone after determining whether the caller terminal has subscribed to the service. When the caller terminal has not subscribed to the service, it is preferable that the system sends a short message to the caller terminal advising of a required subscription of the service.

According to another aspect of the present invention, the system sends a short message to the caller terminal inviting the caller terminal to connect to the system when the predetermined key input is received from the caller terminal. The system changes the tone of the caller terminal only when the caller confirms the change.

According to yet another aspect of the present invention, the system allows a user to change his or her substitute ringback tone to be identical to that of another user by accessing a server at any time. First, the system receives a target phone number from the caller terminal through a communications network and identifies the substitute ringback tone of the target phone number from the play control server. Subsequently, the system changes the substitute ringback tone of the caller terminal by storing the phone number of the caller terminal and the tone code of the target phone number in the play control server after receiving the confirmation of the user. In the case that the system provides the substitute ringback tone service only for service subscribers, it is preferable that the system carries out the process for changing the tone after determining whether the caller terminal has subscribed to the service.

According to still yet another aspect of the present invention, a caller terminal can present a substitute ringback tone to a recipient. The system makes the caller terminal select the phone number of the recipient and the substitute ringback tone to be presented to the recipient. Then, the system sends a short message to the recipient inviting the recipient to connect to the system. When the recipient is connected to the system, the system receives a confirmation for change of the substitute ringback tone of the recipient and changes the tone by storing the identification code of the recipient and the presented tone code in the play control server.

BRIEF DESCRIPTION OF THE DRAWINGS

The above and other objectives and advantages of the present invention will become more apparent by describing in detail preferred embodiments thereof with reference to the attached drawings in which:

FIG. 5 is a flowchart showing a fourth embodiment of the method of setting substitute ringback tone of the present invention.

DESCRIPTION OF SPECIFIC EMBODIMENTS

Figure 1:
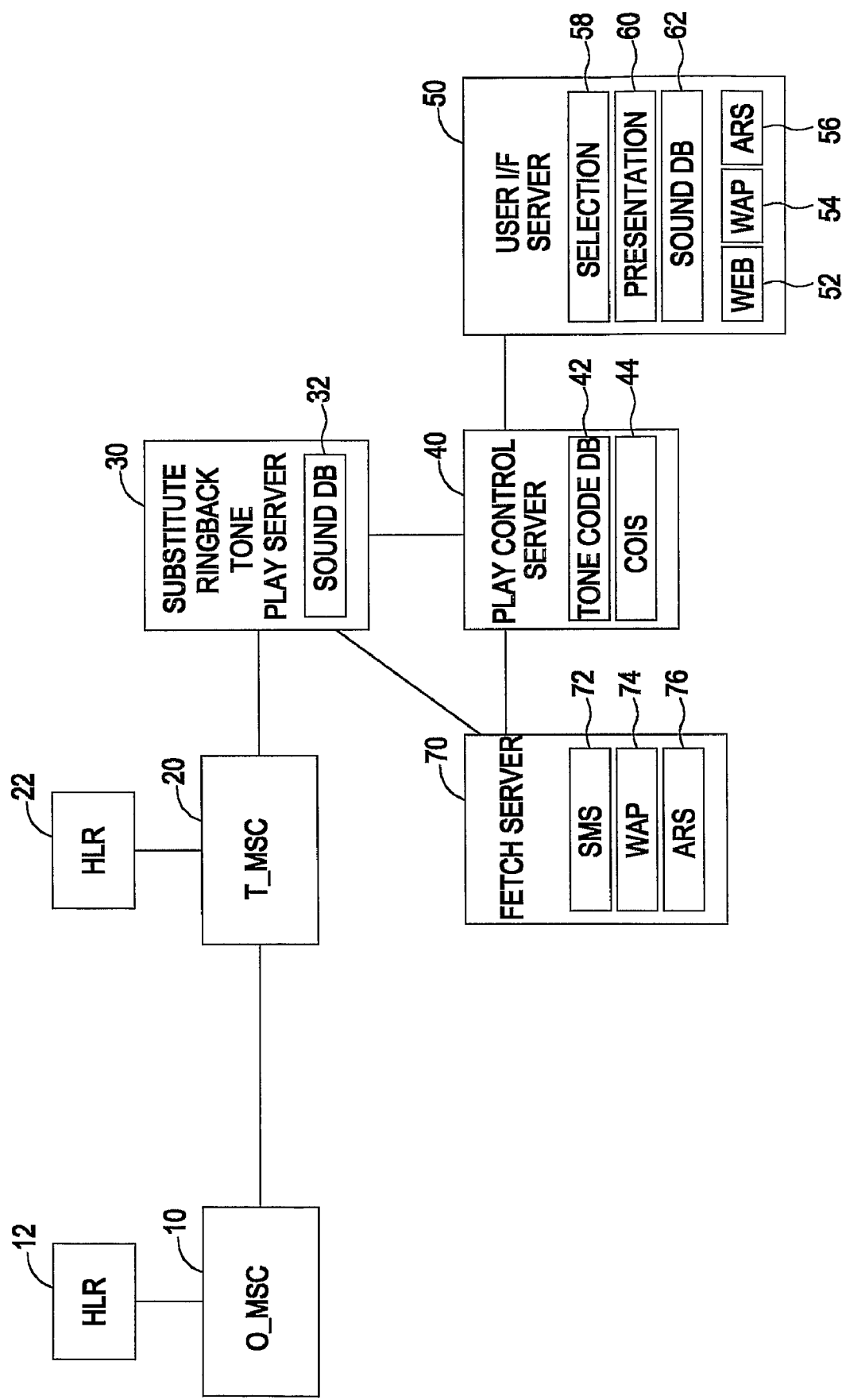
FIG. 1 illustrates an embodiment of a mobile communications system for implementing the method of setting substitute ringback tone of the present invention.

FIG. 1 shows a mobile communications system for implementing a method of setting a substitute ringback tone according to an embodiment of the present invention. An originating switch (O_MSC) 10 and a terminating switch (T_MSC) 20 are connected to each other. The originating switch 10 and the terminating switch 20 are also connected to Home Location Registers (HLR) 12 and 22, respectively. Each HLR 12 or 22 is a register which functions as an intra-network database and maintains the information related to the subscribers and the positions of the subscriber terminals (e.g., the subscriber's telephones) as these are well known in the art. Even though FIG. 1 shows that each of the originating switch 10 and the terminating switch 20 is connected to the respective one of the HLRs 12 and 22, it should be readily understood that a single HLR may adequately provide the services to both switches 10 and 20. Also, it should be readily understood that the roles of the switches 10 and 20 may be interchanged depending on the call setup process, and a single physical switch may carry out the roles performed by the two switches 10 and 20 when a calling party (i.e., "a caller") operably connected to the originating switch 10 and a called party (i.e., "a receiver") operably connected to the terminating switch 20 are both located in the same service area of the single switch.

When a caller using his communication terminal, such as a mobile telephone connected to an originating switch 10, in a service area performs a call registration, the originating switch 10 registers the position information of the caller's communication terminated in the HLR 12. The terminating switch 20 stores in its Visitors Locations Register (VLR) the receiver's service subscription information of the receiver's communication terminal that is located in its service area and the routing information for routing a call to the substitute ringback tone play server 30. The terminating switch 20 provides the substitute ringback tone service (assuming that the user is a subscriber of the service) whenever a call from a caller terminating to the terminating switch 20 is generated as described below.

A play server 30 is connected to the terminating switch 20. The play server 30 is equipped with various substitute ringback tone files in the sound database (DB) 32. When a call is placed from the originating switch 10 to the terminating switch 20 connected to the play server 30, the play server 30 queries the play control server 40 for the substitute ringback tone code designated by the receiver (assuming that the receiver is a subscriber of the substitute ringback tone service). Subsequently, the play server 30 reads out the substitute ringback tone file stored in the sound DB 32 corresponding to the substitute ringback tone code received from the play control server 40 and provides the substitute ringback tone through the terminating switch 20 to the caller at the originating switch 10.

The play control server 40 includes a subscriber substitute ringback tone code DB 42 for storing the substitute ringback tone codes of all service subscribers. The play control server 40 provides the requested substitute ringback tone code corresponding to the requesting subscriber to the play server 30 in response to the request from the play server 30. Further, the play control server 40 may include a Customer-Oriented Information System (COIS) 44 for managing the information of the service subscribers. The COIS 44 provides the information of the service subscriber upon receiving a request from the play control server 40.

The play control server 40 is connected to a subscriber interface I/F server (User I/F Server) 50 to allow a subscriber to request and change the subscriber's own substitute ringback tone with another tone or to allow a subscriber to provide, for example, as a present a substitute ringback tone to a third person. The subscriber I/F server 50 includes a WEB service unit 52 for enabling a subscriber to access through the Internet, a WAP service unit 54 for enabling a subscriber to access through the WAP-based wireless Internet, and an ARS unit 56 for enabling a subscriber to access through the voice communications network. Functionally, the subscriber I/F server 50 includes a substitute ringback tone selection module 58 for enabling a user to select a substitute ringback tone, a presentation module 60 for enabling a user to present a substitute ringback tone to a third person, and a sound DB 62 for storing various substitute ringback tone files similar to the sound DB 32 of the play server 30.

The substitute ringback tone selection module 58 may provide a "listening trial" service by audibly producing a substitute ringback tone file in the sound DB 62 in response to a request from a user. When a subscriber wishes to select or change the substitute ringback tone of his own, the substitute ringback tone selection module 58 provides a terminal identification code (e.g., a phone number) of the requesting subscriber and the code designated to the substitute ringback tone selected by the subscriber to the play control server 40, so that the play control server 40 can store the received information. When the subscriber wishes to provide a substitute ringback tone to a third person, the presentation module 60 requests and receives the terminal identification code (e.g., the phone number) of the third person recipient, and temporarily stores the recipient's terminal identification code as well as the code designated to the substitute ringback tone selected by the subscriber, and then requests the third person recipient to confirm the receipt of the substituted ringback tone being provided to him by returning a short message containing the callback URL of the system. When the third party recipient connects and requests to set up the substitute ringback tone, the presentation module 60 provides the terminal identification code of the third party recipient and the code of the substitute ringback tone that has been presented to and received by the recipient to the play control server 40, so that the play control server 40 would store the received information.

A fetch server 70 stores the substitute ringback tone code of the receiver in response to the request of the caller. The fetch server 70 includes a SMS unit 72, a WAP unit 74, and a ARS unit 76. A caller at the originating switch 10 who wishes to choose the substitute ringback tone of the receiver the caller has heard while placing a call to the receiver at the terminating switch 20 can submit a fetch request by pressing a certain key or a combination of keys in sequence. The fetch request from the caller is transmitted to the play server 30 via the terminating switch 20, and the play server 30 transmits the terminal identification code (e.g., the phone number) of the caller and the code designated to the substitute ringback tone heard by the caller to the fetch server 70, so that the fetch server 70 stores the received information. Here, the fetch server 70 may request the caller to confirm the change of the substitute ringback tone by sending a short message containing the callback URL of the system. When the caller requests a substitute ringback tone as described above, the fetch server 70 then provides the caller's terminal identification code (e.g., the phone number) and the code of the substitute ringback tone heard and requested by the caller to the play control server 40 so that the play control server 40 stores the received information.

Figure 2:
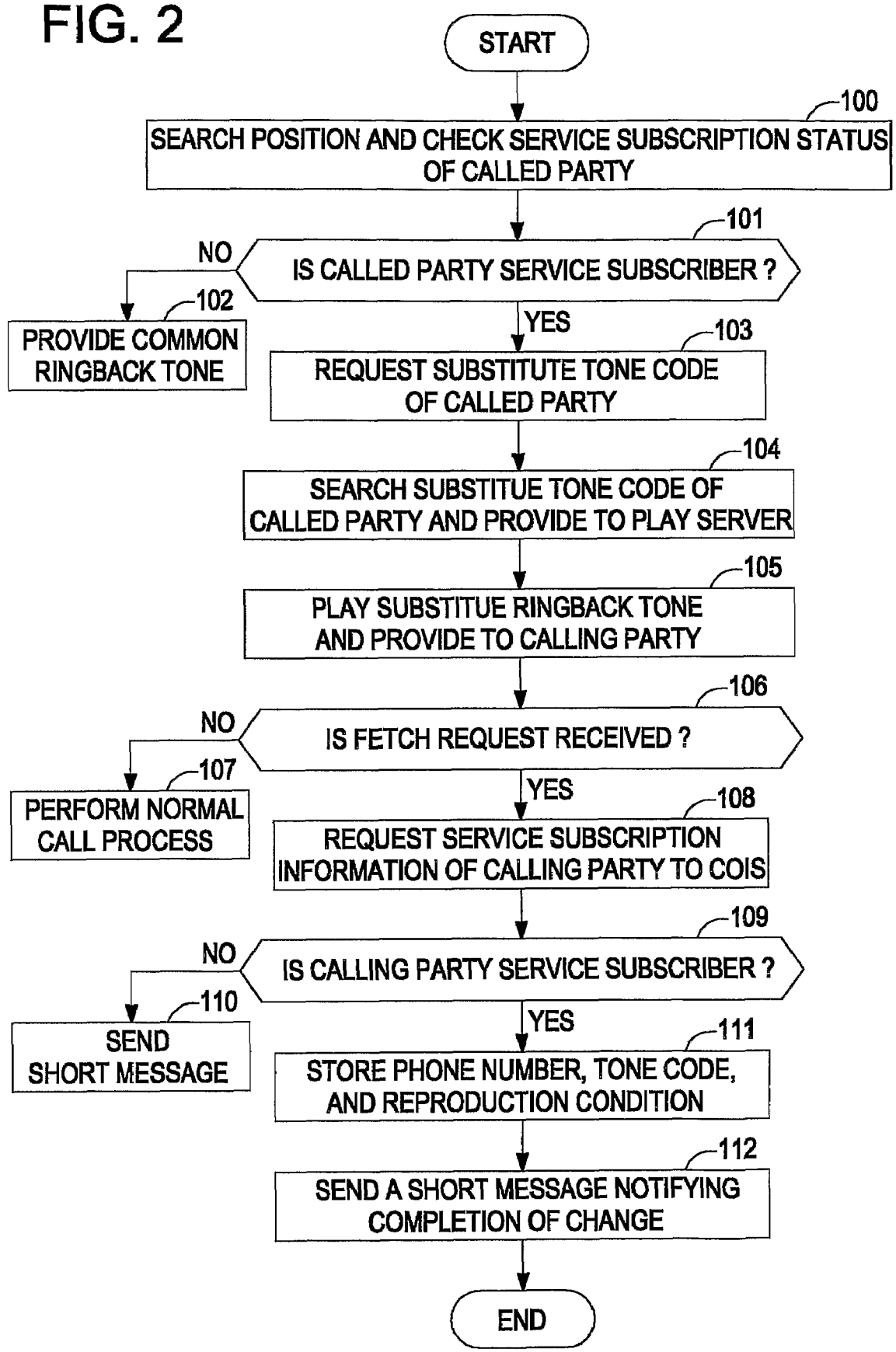
FIG. 2 is a flowchart showing a first embodiment of the method of setting substitute ringback tone of the present invention.

FIG. 2 shows a method of setting the substitute ringback tone according to an embodiment of the present invention. The fetch server 70 changes the caller's substitute ringback tone to be identical to that of the receiver's substitute ringback tone, which was heard by the caller, upon receiving the fetch request from the caller.

When the caller generates a call to a receiver, who has subscribed to the substitute ringback tone service, the originating switch 10 requests the position information of the caller's communication terminal (e.g., the mobile telephone) from the HLR 12. The HLR 12 also requests routing information from the terminating switch 20 responsible for the receiver's communication terminal (e.g., a mobile telephone), and the terminating switch 20 responds to the originating switch 10 by providing the position information and the routing information of the receiver's terminal. The originating switch 10 tries a ISDN User Part (ISUP) call to the terminating switch 20 using the termination position information of the receiver. Subsequently, the terminating switch 20 acquires the service subscription information of the receiver from the HLR 22 using the receiver's terminal identification information, and determines whether the receiver has subscribed to the substitute ringback tone service (steps 100 and 101). If the receiver has not subscribed to the substitute ringback tone service, the terminating switch 20 provides a common or traditional ringback tone to the caller (step 102). If, however, it is determined that the receiver has subscribed to the service in the step 101, the terminating switch 20 suspends the call to the receiver and routes the call to the play server 30.

In step 103, the play server 30 requests the substitute ringback tone code, which was previously selected and designated by the receiver, from the play control server 40. The play control server 40 searches for the substitute ringback tone code of the receiver from the substitute ringback tone code DB 42 and provides the requested code to the play server 30 (step 104). The play server 30 then reads out the substitute ringback tone file from the sound DB 32 using the code and audibly produces the substitute ringback tone to the caller at the originating switch 10 through the terminating switch 20 (step 105).

Afterwards, the play server 30 checks for any key input from the caller corresponding to a fetch request while the receiver's set ringback tone is audibly played out for the caller (step 106). If there is no fetch request key input, a call channel is then set up between the caller and the receiver in a normal manner, and then the call connection between the caller and the receiver is completed (step 107). If a play server 30 receives a fetch request from the caller, the fetch server 70 receives the caller's terminal identification code (e.g., the caller's phone number) from the terminating switch 20 or the play server 30, and requests the service subscription information of the caller from the COIS 44 to determine whether the caller has also subscribed to the substitute ringback tone service (steps 108 and 109).

If it is determined that the caller is not a subscriber of the substitute ringback tone service in the step 109, the fetch server 70 sends a short message containing the callback uniform resource locator (URL) of the system to the caller advising the subscription status of the service (step 110). On the other hand, if it is determined that the caller has subscribed to the substitute ringback tone service in the step 109, the fetch server 70 stores the caller's termination identification code (e.g., the caller's phone number) and the code of the receiver's substitute ringback tone (which has been requested by the caller via a fetch request) in the play control server 40. At this time, a certain reproduction condition may be stored along with the substitute ringback tone code. The reproduction condition may be a default condition under which a single substitute ringback tone designated by the receiver is played regardless of the caller or the reproduction time. The reproduction condition, however, may include a reproduction time condition for limiting the time or duration of the substitute ringback tone being reproduced, and a reproduction target condition for limiting the callers to whom the substitute ringback tone is reproduced (step 111).

In step 112, the fetch server 70 notifies the completion of change of the substitute ringback tone by sending a short message containing some information stored in the play control server 40 to the caller (step 112).

Figure 3:
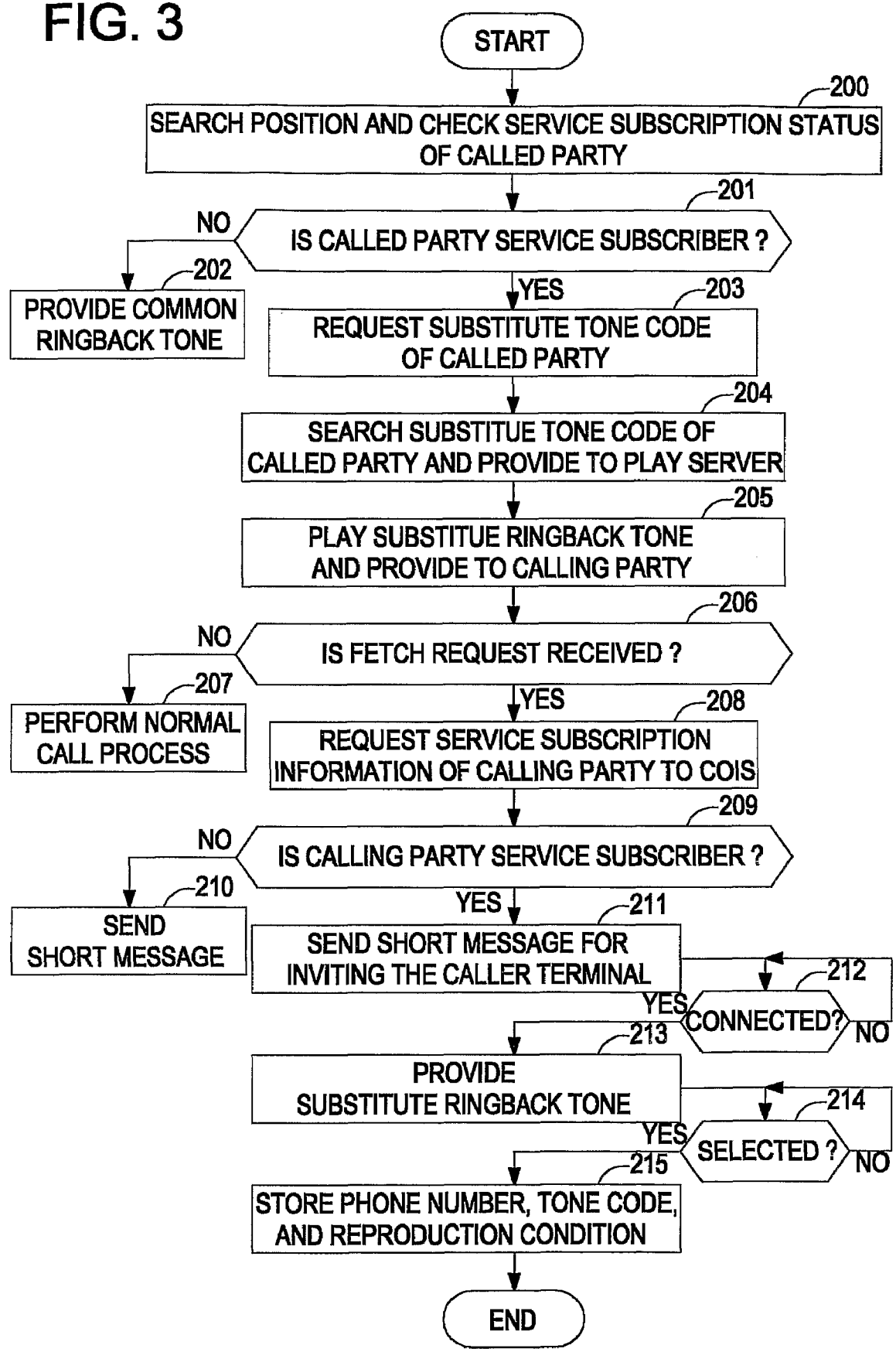
FIG. 3 is a flowchart showing a second embodiment of the method of setting substitute ringback tone of the present invention.

FIG. 3 shows a method of setting substitute ringback tone according to a second embodiment of the present invention. In this embodiment, the fetch server 70 changes the substitute ringback tone of the caller to be identical to that of the receiver after receiving a confirmation of the caller.

Steps 200-210 in FIG. 3 are similar to steps 100-110 in FIG. 2. That is, when a caller generates a call to a receiver who has subscribed to the substitute ringback tone service, the originating switch 10 acquires the position information of the receiver's terminal (e.g., the telephone) from the HLR 22, and tries a ISUP call to the terminating switch 20 using the termination position information. Subsequently, the terminating switch 20 acquires the service subscription information of the receiver from the HLR 22, and determines whether the receiver has subscribed to the substitute ringback tone service (steps 200 and 201). If the receiver has not subscribed to the service, the terminating switch 20 provides a common or traditional ringback tone to the caller (step 202). If, however, it is determined that the receiver has subscribed to the service in the step 101, the terminating switch 20 suspends the call to the receiver and routes the call to the play server 30.

In steps 203 and 204, the play server 30 acquires the substitute ringback tone code previously selected and designated by the receiver from the play control server 40, and reads out the substitute ringback tone file from the sound DB 32 using the code information and audibly produces the substitute ringback tone to the caller at the originating switch 10 through the terminating switch 20 (step 205).

Afterwards, the play server 30 checks for any key input from the caller corresponding to a fetch request while the receiver's substitute ringback tone is being played out for the caller (step 206). If there is no fetch request key input, a call channel is set up between the caller and the receiver in a normal manner, and then the call connection between the caller and the receiver in a normal manner, and then the call connection between the caller and the receiver is completed (step 207). If a fetch request is received from the caller, however, the fetch server 70 receives the caller's terminal identification code (e.g., the phone number) from the terminating switch 20 or the play server 30, and requests the service subscription information of the caller from the COIS 44 to determine whether the caller has subscribed to the substitute ringback tone service (steps 208 and 209). If the caller has not subscribed to the substitute ringback tone service in the step 209, the fetch server 70 sends a short message containing the callback URL of the system to the caller advising the caller of the subscription status of the service (step 210).

On the other hand, if it is determined that the caller has subscribed to the substitute ringback tone service in the step 209, the fetch server 70 sends a short message containing a callback URL and the tone code of the receiver, so that the caller visits the user I/F server 50 after the completion of the call to request or confirm the change of the substitute ringback tone (step 211). If the caller's communication terminal is connected to the user I/F server 50 using the callback URL or through the ARS or the Internet, the user I/F server 50 provides the substitute ringback tone to the caller's communication terminal (step 213). If the caller selects the substitute ringback tone, the user I/F server 50 provides the phone number of the caller and the substitute ringback tone code of the receiver to the play control server 40, so that the play control server 40 can store the received information (steps 214 and 215). At this time, reproduction conditions mentioned above may also be stored along with the substitute ringback tone code.

Figure 4:
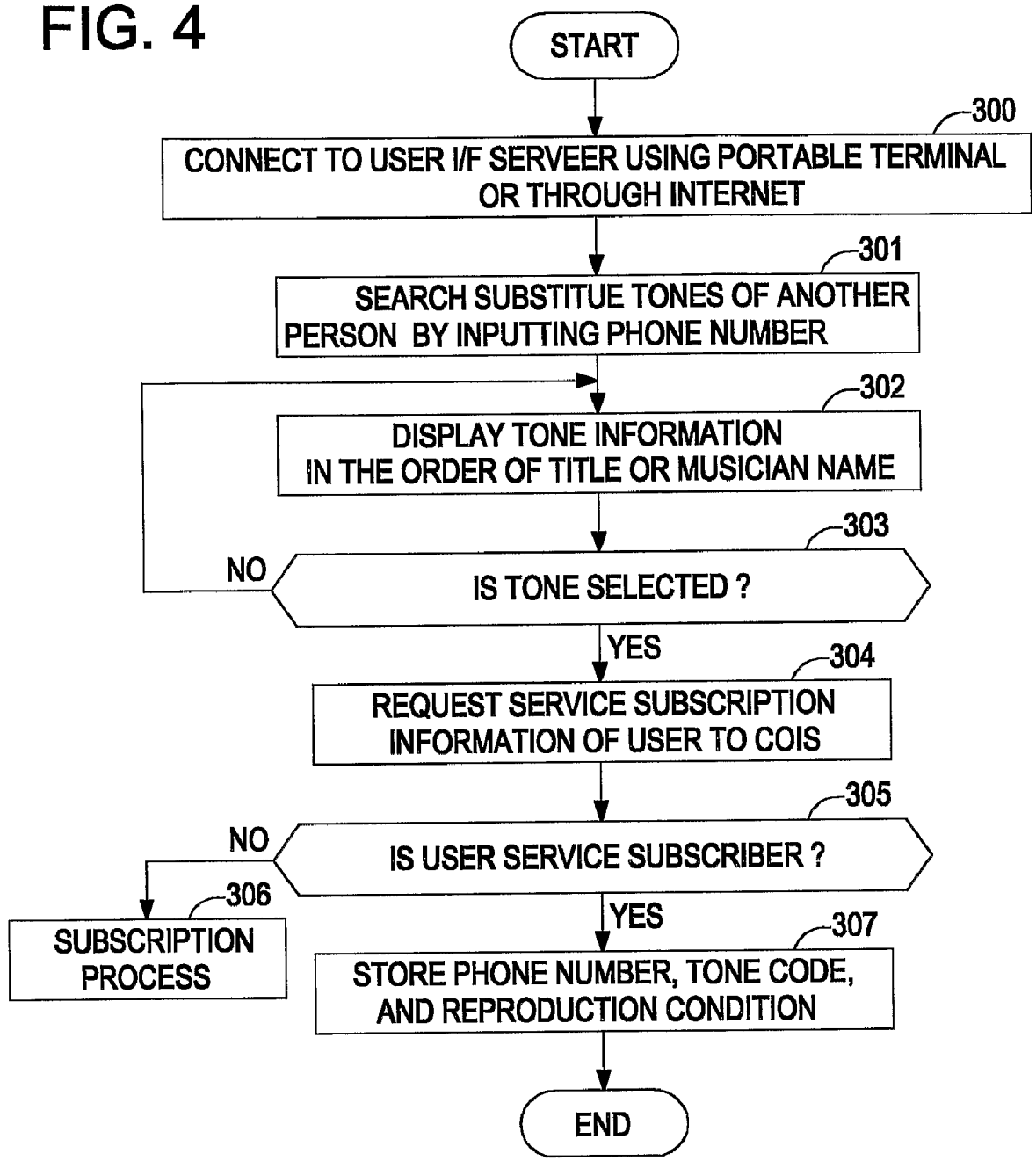
FIG. 4 is a flowchart showing a third embodiment of the method of setting substitute ringback tone of the present invention.

FIG. 4 shows a method of setting substitute ringback tone according to a third embodiment of the present invention. According to this embodiment, a requesting user can set his substitute ringback tone to be identical to that of another user by accessing the system at any time after the completion of a call.

First, the requesting user connects to the subscriber I/F server 50 through the WAP-based wireless Internet, for example, using the portable terminal. At this time, the requesting user may connect to the subscriber I/F server 50 by calling to the ARS subsystem or through the common Internet using another data terminal, as well (step 300). If the requesting user wishes to set the substitute ringback tone to be identical with that of another user, the requesting user requests the subscriber I/F server 50 to search substitute ringback tones of the another user by inputting the phone number of the another user (step 301). Upon receiving the search request, the subscriber I/F server 50 requests that the play control server 40 perform the search. The play control server 40 searches the tone code information set for the phone number from the tone code DB 42 and provides the search result to the subscriber I/F server 50. In case a plurality of substitute ringback tones are set for playing under respective reproduction conditions such as target callers or the time, a list containing all the substitute ringback tone information is provided to the subscriber I/F server 50. The subscriber I/F server 50 displays to the requesting user the substitute ringback tone information from the play control server 40 in the order of the title of the tone or the name of the musician (step 302).

If the requesting user selects one of the substitute ringback tones in step 303, the subscriber I/F server 50 requests that the play control server 40 check whether the requesting user has subscribed to the substitute ringback tone service (step 304). The play control server 40 checks the service subscription information of the requesting user by referring to the information stored in the COIS 44, and provides the checking result to the subscriber I/F server 50. If the requesting user has not subscribed to the substitute ringback tone service in the step 305, the subscriber I/F server 50 guides the subscription of the service to the requesting user, and the requesting user has the choice of carrying out the subscription process (step 306). On the other hand, if it is determined that the requesting user has subscribed to the substitute ringback tone service in the step 305, the subscriber I/F server 50 provides the phone number of the requesting user and the selected substitute ringback tone code to the play control server 40 so that the play control server 40 can store the information (step 307). At this time, reproduction conditions mentioned above may also be stored along with the substitute ringback tone code.

FIG. 5 shows a method of setting a substitute ringback tone according to a fourth embodiment of the present invention. This embodiment enables a requesting user to present a substitute ringback tone to another person (i.e., a recipient).

A requesting user of the service who wishes to present a substitute ringback tone to another person first connects to the subscriber I/F server 50 through the Internet or by calling to the ARS subsystem. After accessing the subscriber I/F server 50, the requesting user selects a 'presentation' menu and specifies the intended recipient by inputting the phone number of the recipient (step 400). After receiving the presentation request, the subscriber I/F server 50 requests that the play control server 40 check whether the intended recipient has subscribed to the substitute ringback tone service (step 401).

The play control server 40 checks the service subscription information of the recipient by referring to the information stored in the COIS 44, and provides the checking result to the subscriber I/F server 50. If the recipient has not subscribed to the substitute ringback tone service in step 402, the subscriber I/F server 50 provides a message that the service is not available for the recipient and completes the process (step 403).

On the other hand, if it is determined that the recipient has subscribed to the substitute ringback tone service in the step 402, the subscriber I/F server 50 allows the requesting user to search for a substitute ringback tone to present to the recipient and provides a 'listening trial' service for the requesting user by audibly producing the selected substitute ringback tone file. If the requesting user completes the selection of the substitute ringback tone to be presented to the recipient in step 405, the subscriber I/F server 50 temporarily stores the phone number of the recipient and the code of the selected substitute ringback tone, and sends a short message containing the callback URL, so that the recipient visits the subscriber I/F server 50 and confirms the use of the presented substitute ringback tone (steps 406 and 407).

If the recipient visits the user I/F server 50 using the callback URL, through the ARS, or the Internet in the step 408, the user I/F server 50 provides the substitute ringback tone to the recipient and advises the method of confirming the receipt (step 409). If the recipient selects the substitute ringback tone, the user I/F server 50 provides the phone number of the recipient and the presented substitute ringback tone code to the play control server 40, so that the play control server 40 can store the information (steps 410 and 411). At this time, reproduction conditions mentioned above may also be stored along with the substitute ringback tone code.

According to the present invention, when a caller wishes to adopt the substitute ringback tone of the receiver to be caller's own while the caller is hearing the substitute ringback tone of the receiver, the caller can easily set his substitute ringback tone to be identical to that of the receiver. The caller submits the fetch request merely by pressing a predetermined key input sequence, and the system changes the substitute ringback tone of the caller immediately unless confirmation of the receiver is necessary. Also, a subscribing user can access the system and set the substitute ringback tone of another user to be that of his own.

Accordingly, the present invention enhances the satisfaction of the substitute ringback tone service users and may therby increase the revenue of the contents providers providing the services and the carrier operating the wireless communications network.

It will be clear that the present invention is well adapted to attain the ends and advantages mentioned as well as those inherent therein. While a various embodiments including the presently preferred one has been described for purposes of this disclosure, various changes and modifications may be made, which are well within the scope of the present invention. Numerous other changes may be made which will readily suggest themselves to those skilled in the art and which are encompassed in the spirit of the invention disclosed and as defined in the appended claims.

What is claimed is:

1. In a system connected to a mobile switching center configured to provide a substitute ringback tone to a caller terminal while the mobile switching center is establishing a call connection between the caller and receiver terminals, a method of providing the substitute ringback tone to the caller terminal comprising the steps of:

storing substitute ringback tone setting information of every service subscriber who has subscribed to a substitute ringback tone service in a play control server, and storing various substitute ringback tones in a play server, wherein the play server is configured to reproduce and provide one of the various substitute ringback tones in response to a request from the mobile switching center, the substitute ringback tone being selected based on the setting information stored in the play control server;

receiving a call information including an identification code of the receiver terminal from the mobile switching center;

identifying a tone code for the receiver terminal from the play control server, reproducing the substitute ringback tone corresponding to the identified tone code, and providing the substitute ringback tone to the caller terminal;

checking whether a predetermined key input is received from the caller terminal; and when the predetermined key input is received from the caller terminal, checking the identification code of the caller terminal and the tone code for the receiver terminal stored in the play control server and setting the substitute ringback tone of the caller terminal such that the substitute ringback tone of the caller terminal is identical to the substitute ringback tone of the receiver terminal.

2. The method of claim 1, further comprising the step of:

sending a short message to the caller terminal for notifying a change of the substitute ringback tone.

3. The method of claim 1, wherein said step of checking the identification code of the caller terminal and the tone code for the receiver terminal comprises the steps of:

upon receiving the predetermined key input, determining whether the caller terminal has subscribed to the substitute ringback tone service; and when the caller terminal has not subscribed to the substitute ringback tone service, sending a short message to the caller terminal advising the caller terminal of a required subscription of the service.

\* \* \* \* \*